US009545677B2

(12) United States Patent
Pasquetto (10) Patent No.: US 9,545,677 B2
(45) Date of Patent: Jan. 17, 2017

(54) NUMERICAL CONTROL MACHINE-TOOL (71) Applicant: O.M.V. OFFICINE MECCANICHE VENETE S.p.A., Santa Maria di Sala (IT)

(72) Inventor: Franco Pasquetto, Cadoneghe (IT)

(73) Assignee: O.M.V. OFFICINE MECCANICHE VENETE S.P.A. (IT)

( * ) Notice: Subject to any disclaimer, the term of this patent is extended or adjusted under 35 U.S.C. 154(b) by 129 days.

(21) Appl. No.: 14/640,820

(22) Filed: Mar. 6, 2015

(65) Prior Publication Data
US 2015/0251287 A1 Sep. 10, 2015

(30) Foreign Application Priority Data

Mar. 6, 2014 (IT) .............................. TV2014A0034

(51) Int. Cl.
*B23C 1/00* (2006.01)
*B23Q 11/00* (2006.01)
(Continued)

(52) U.S. Cl.
CPC ................. *B23C 1/007* (2013.01); *B23C 1/06* (2013.01); *B23Q 1/015* (2013.01); *B23Q 1/626* (2013.01);
(Continued)

(58) Field of Classification Search
CPC .............. Y10T 409/30784; Y10T 409/307952; Y10T 409/30952; Y10T 409/309576; Y10T 409/309632; Y10T 409/309688; Y10T 408/91; Y10T 408/92; B23Q 1/626; B23C 1/007
(Continued)

(56) References Cited

U.S. PATENT DOCUMENTS 5,988,959 A * 11/1999 Sugata ................. B23Q 1/0009
408/143
6,161,995 A * 12/2000 Wakazono ............. B23Q 1/015
408/234
(Continued)

FOREIGN PATENT DOCUMENTS

EP 0742072 11/1996
EP 1182004 2/2002
(Continued)

OTHER PUBLICATIONS

Corresponding European Search Report for EP15158081 dated Jul. 15, 2015.
(Continued)

*Primary Examiner* — Erica E Cadugan
*Assistant Examiner* — Michael Vitale
(74) *Attorney, Agent, or Firm* — The Belles Group, P.C.

(57) ABSTRACT

A numerical control machine-tool includes: a ground-resting base plate; a movable supporting column rising cantilevered from the base plate in a substantially vertical direction and movable horizontally on said base plate; a first electronic-controlled drive assembly for moving the supporting column along the base plate; a head-carrier slide fixed in vertically sliding manner in a straight longitudinal slit extending along the front face of the supporting column parallel to the longitudinal/vertical axis of the supporting column; a second electronic-controlled drive assembly for moving the head-carrier slide along the supporting column; a straight supporting beam inserted in an axially sliding manner into the head-carrier slide and cantilevered juts out from the front face of the supporting column while remaining substantially parallel to the ground; and a third electronic-controlled drive assembly for moving the supporting beam forwards and
(Continued)

backwards with respect to the head-carrier slide parallel to the beam longitudinal axis.

10 Claims, 6 Drawing Sheets

(51) Int. Cl.
*B23Q 11/08* (2006.01)
*B23Q 1/01* (2006.01)
*B23Q 5/28* (2006.01)
*B23C 1/06* (2006.01)
*B23C 1/12* (2006.01)
*B23Q 1/62* (2006.01)

(52) U.S. Cl.
CPC ............. *B23Q 5/28* (2013.01); *B23Q 11/0025* (2013.01); *B23Q 11/08* (2013.01); *B23B 2260/0625* (2013.01); *B23C 1/12* (2013.01); *B23C 2260/04* (2013.01); *B23C 2270/022* (2013.01); *B23Q 1/017* (2013.01); *B23Q 1/625* (2013.01); *Y10T 29/5114* (2015.01); *Y10T 408/91* (2015.01); *Y10T 408/92* (2015.01); *Y10T 409/3098* (2015.01); *Y10T 409/30392* (2015.01); *Y10T 409/300896* (2015.01); *Y10T 409/305656* (2015.01); *Y10T 409/307672* (2015.01); *Y10T 409/309576* (2015.01); *Y10T 409/309688* (2015.01)

(58) Field of Classification Search
USPC ............... 409/204, 206, 234, 235, 236, 237; 408/234, 235; 29/27 R, 27 C
See application file for complete search history.

(56) References Cited

U.S. PATENT DOCUMENTS

| | | | |
|---|---|---|---|
| 6,652,204 B2* | 11/2003 | Stengele | B23Q 1/623 310/13 |
| 7,220,090 B2* | 5/2007 | Wakazono | B23Q 1/01 310/12.05 |
| 7,261,503 B2* | 8/2007 | Motta | B23Q 1/015 310/12.04 |
| 7,527,460 B2* | 5/2009 | Gueli | B23Q 1/01 408/234 |
| 2004/0077470 A1* | 4/2004 | Camozzi | B23Q 1/015 483/31 |
| 2004/0140721 A1 | 7/2004 | Chang et al. | |
| 2006/0188352 A1 | 8/2006 | Krosta et al. | |
| 2014/0020527 A1 | 1/2014 | Yang et al. | |

FOREIGN PATENT DOCUMENTS

| | | |
|---|---|---|
| EP | 1695791 | 8/2006 |
| JP | 11235631 A * | 8/1999 |
| JP | 2000237923 A * | 9/2000 |
| WO | 0228592 | 4/2002 |
| WO | 02066205 | 8/2002 |

OTHER PUBLICATIONS

Italian Search Report for corresponding IT Application No. TV2014A000034 dated Oct. 30, 2014.

* cited by examiner

NUMERICAL CONTROL MACHINE-TOOL

CROSS-REFERENCE TO RELATED APPLICATIONS

Priority is claimed, under 35 U.S.C. §119(b), to Italian patent application No. TV2014A000034, the disclosure of which is incorporated herein by reference in its entirety.

FIELD OF THE INVENTION

The present invention relates to a numerical control machine-tool.

More in detail, the present invention relates to a numeric control milling machine with column structure for machining large metal pieces with complex three-dimensional structures. Use to which the following description will make explicit reference without however losing in generality.

BACKGROUND OF THE INVENTION

As known, numeric control milling machines with column structure are usually provided with a large base plate, which is structured to stably rest on and be anchored to the ground; with a movable supporting column that rises cantilevered from the base plate in a vertical direction and is capable of moving horizontally on the base plate along straight guides, which are parallel to the ground and to a first horizontal reference axis of the machine; and with a part-holding table, which is located by the side of the base plate and is structured so as to be able to firmly hold the metal part to be milled, usually also with the possibility of turning the metal part on command about one or more reference axes which are orthogonal to one another.

In the most sophisticated milling machines currently available on the market, the supporting column is moved along the straight guides of the base plate by means of a large electronically-controlled electric linear motor, which is interposed between the base plate and the lower end of the supporting column.

The numerical control milling machines with column structure are furthermore provided with a large head-carrier slide, which is inserted in vertically sliding manner in the supporting column so as to be able to move along the supporting column parallel to a second machine reference axis which is vertical and orthogonal to the first reference axis; and with a long straight supporting beam with square section, which is inserted in pass-through and axially sliding manner in the head-carrier slide, so as to cantilevered jut out from the supporting column towards the adjacent part-holding table, while remaining parallel to the ground and to a third machine reference axis which is horizontal and perpendicular to both the first and the second machine reference axes.

Finally, the numeric control milling machines with column structure are provided with an electronically-controlled drive system capable of horizontally moving the supporting beam forwards and backwards with respect to the head-carrier slide, so as to be able to vary the length of the supporting beam stretch that cantilevered juts out from the column towards the part-holding table; and with a spindle-carrier head which is fixed onto the distal end of the horizontal supporting beam so as to be able to reach the metal piece located on the part-holding table.

In the more sophisticated milling machines currently on the market, the head-carrier slide is moved along the supporting column by means of one, or more often, two recirculating ball screws that are arranged vertically on the supporting column, on opposite sides of the head-carrier slider, and are driven by a big electrically-operated geared motor.

Unfortunately, in the taller column milling machines, the length of the recirculating ball screws may reach values which are so high as to limit in significant manner the performance of the numerical control machine. In fact, the inertia of these particular metallic components does not allow to impress high value accelerations to the head-carrier slide.

SUMMARY OF THE INVENTION

Aim of the present invention is to realize a numerical control milling machine with column structure which can overcome the drawbacks referred above.

In compliance with the above aims, according to the present invention there is provided a numerical control machine-tool as defined in claim 1 and preferably, though not necessarily, in any dependent claim.

BRIEF DESCRIPTION OF THE DRAWINGS

The present invention will now be described with reference to the accompanying drawings, which show a non-limitative embodiment thereof, in which:

FIGS. 4 and 5 are two exploded axonometric views of the moveable supporting column of the machine-tool shown in FIGS. 1 and 2, with parts removed for clarity; while

DETAILED DESCRIPTION OF THE INVENTION

Figure 1:
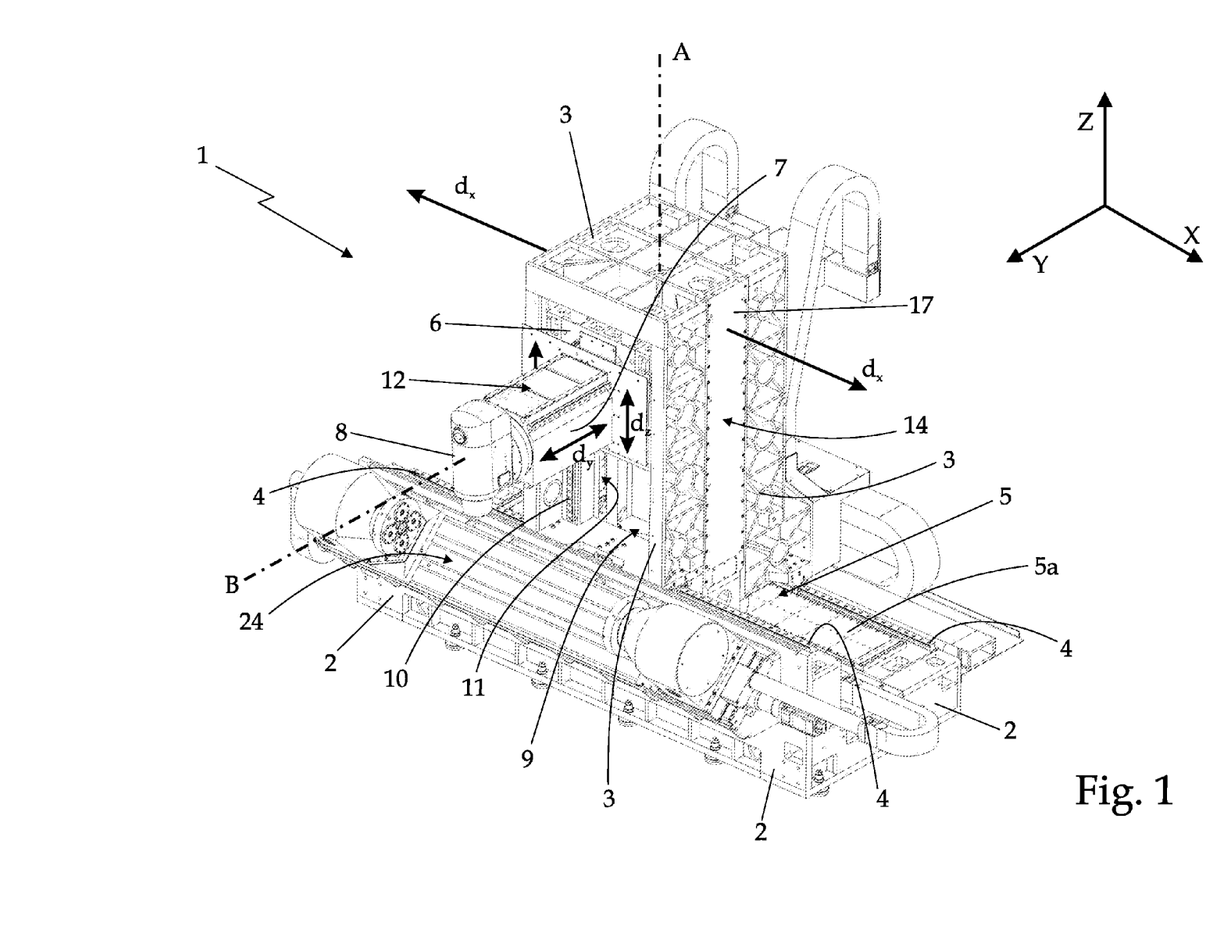
FIG. 1 is an axonometric view, with parts removed for clarity, of a numerical control machine-tool with column structure made according to the teachings of the present invention.
Figure 2:
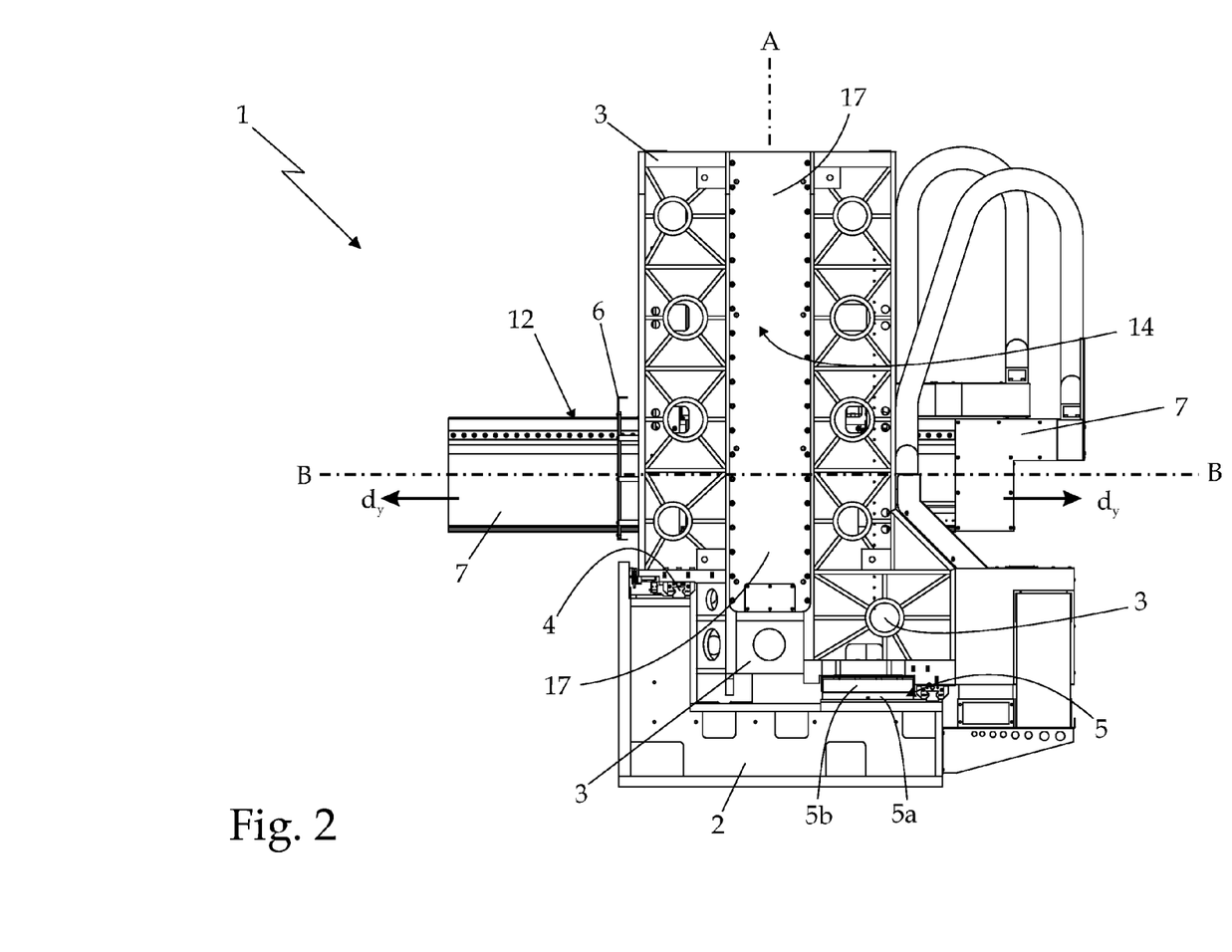
FIG. 2 is a front view of the machine-tool shown in FIG. 1, with parts removed for clarity.
Figure 3:
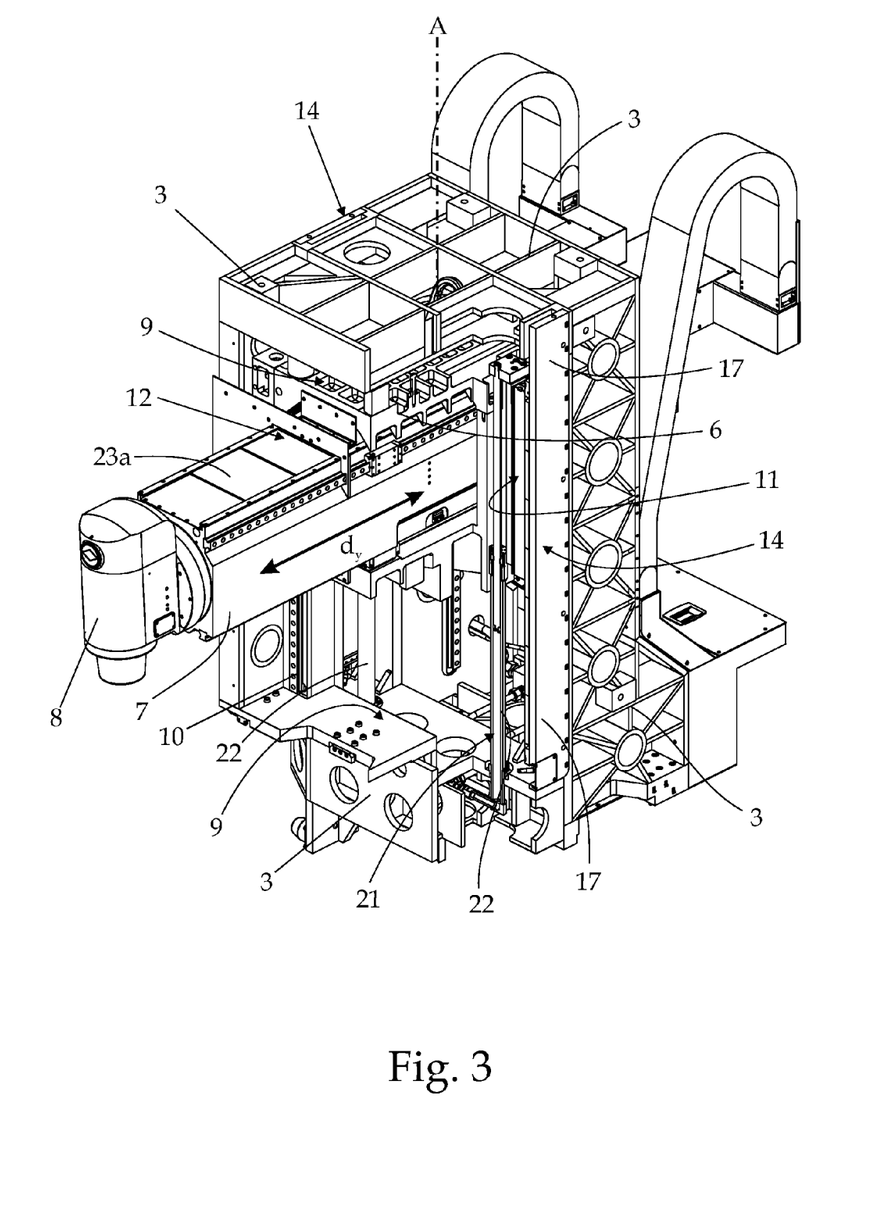
FIG. 3 is a partially-sectioned axonometric view of the central part of the machine-tool shown in FIG. 1, with parts removed for clarity.

With reference to FIGS. 1, 2 and 3, reference numeral 1 indicates as a whole a numerical control machine particularly adapted to mill large metal pieces with complex three-dimensional structure.

The machine-tool 1 substantially comprises a large ground-resting base plate 2, substantially of the plate-shaped typed, which is structured to rest stably on the ground, and optionally also be anchored to the ground by means of anchor bolts (not shown) or other anchoring systems; and a preferably substantially parallelepiped-shape, moveable supporting column 3 that rises cantilevered from the base plate in vertical direction, and is capable of moving horizontally on the base plate 2 while remaining always parallel to itself, in a direction $d_x$ parallel to the ground and to a first reference Cartesian axis X of the machine.

More in detail, in the example shown, the base plate 2 is preferably provided with a series of straight horizontal guides 4 (two straight guides 4 in the example shown) which extend on the back of the base plate 2 one beside the another, while remaining substantially parallel to the ground and to the Cartesian axis X; and the lower end of the moveable supporting column 3 is preferably arranged resting in sliding manner on the straight horizontal guides 4, so as to be able to freely slide on the back of the base plate 2 parallel to the Cartesian axis X.

Preferably, the ground-resting base plate 2 and/or the moveable supporting column 3 are moreover made of metal material.

Additionally, the machine-tool 1 is also provided with a first electronically-controlled drive assembly 5 which is preferably interposed between the base plate 2 and the moveable supporting column 3, and is structured so as to be able to move, on command, the supporting column 3 along the back of the base plate 2 in direction $d_x$.

In the example shown, in particular, the machine-tool 1 is preferably provided with an electric linear motor 5 which is preferably interposed between the base plate 2 and the lower end of the supporting column 3, and is structured so as to be able to move, on command, the supporting column 3 forwards and backwards along the straight horizontal guides 4.

More in detail, the electric linear motor 5 comprises a stationary stator track 5, and a traveling slide 5b which is moveable grazing the stator track 5a. The stator track 5a extends on the back of the base plate 2 parallel to the Cartesian axis X, preferably by the side of at least one of the straight horizontal guides 4 and preferably substantially for the entire length of the straight horizontal guides 4; whereas the traveling slide 5b is rigidly attached to the supporting column 3, preferably underneath the lower end of the supporting column 3, so as to locally face and be tangent to a portion of the stator track 5a.

Preferably, the stator track 5a of the electric linear motor 5 furthermore comprises a long sequence of permanent magnets (not shown) which are arranged by the side to one another to form a straight ribbon-like body, which is structured so to be rigidly attached on the back of the base plate 2 parallel to one of the horizontal straight guides 4.

Preferably, the traveling slide 5b of the electric linear motor 5 instead incorporates the electric windings which, if appropriately powered, cause and control the movement of the traveling slide 5b along the stator track 5a.

The stator track 5a and the traveling slide 5b of the electric linear motor 6 are components of known type, and won't be further described.

With reference to FIGS. 1, 2 and 3, the machine-tool 1 furthermore comprises: a head-carrier slide 6 which is fixed in sliding vertical manner onto the supporting column 3, so as to be able to move along the supporting column 3 in a direction $d_z$ perpendicular to the ground, i.e. vertical, and parallel to a second machine reference Cartesian axis Z which is perpendicular to the Cartesian axis X; a long straight supporting beam 7 which is inserted in axially sliding manner into the head-carrier slide 6, and moreover cantilevered juts out from the front face of the supporting column 3 while remaining substantially parallel to the ground and to a third machine reference Cartesian axis Y which is horizontal and perpendicular to the Cartesian axes X and Z; and a tool-carrier head 8 which is fixed on the distal end of the horizontal supporting beam 7, facing the front face of the supporting column 3, and is preferably provided with an electrically-actuated motor-spindle or the like, which is structured so as to be able to accommodate and drive into rotation a generic tool for numeric control machines.

More in detail, in the example shown the supporting column 3 is provided with a long, substantially rectangular-shaped, straight longitudinal slit 9 which extends on the front face of the supporting column 3 parallel to the longitudinal/vertical axis A of the column 3, preferably substantially along the vertical midplane of the column and approximately for the entire height of the supporting column 3; and the head-carrier slide 6 is located inside the longitudinal slit 9, and is fixed in axially sliding manner onto a series of straight vertical guides 10 extending inside the longitudinal slit 9 parallel to the longitudinal/vertical axis A of the supporting column 3, so as to be able to freely move inside the longitudinal slit 9 in vertical direction, while remaining always parallel to itself.

Preferably, the straight longitudinal slit 9 formed on front face of supporting column 3 is of the pass-through type, i.e. extends from the front face to the rear face of the supporting column 3, and the supporting beam 7 is inserted in pass-through and axially sliding manner in a through hole formed in the head-carrier slide 6, so as to cantilevered jut out both from the front face and from the rear face of the supporting column 3.

Preferably, the supporting beam 7 moreover has a substantially rectangular or square shaped cross section.

With reference to FIG. 1, the machine-tool 1 is furthermore provided with a second electronically-controlled drive assembly 11 which is interposed between the supporting column 3 and the head-carrier slide 6, and is structured so as to be able to move, on command, the head-carrier slide 6 along the supporting column 3 parallel to the longitudinal axis A, i.e. to direction $d_z$; and with a third electronically-controlled drive assembly 12 which is interposed between the head-carrier slide 6 and the supporting beam 7, and is structured so as to be able to move, on command, the supporting beam 7 backwards and forwards with respect to the head-carrier slide 6 parallel to the longitudinal axis B of the same supporting beam 7, i.e. in direction $d_y$, so as to be able to vary the length of the stretch of the supporting beam 7 that cantilevered juts out from the front face of the supporting column 3 on command.

Figure 4:
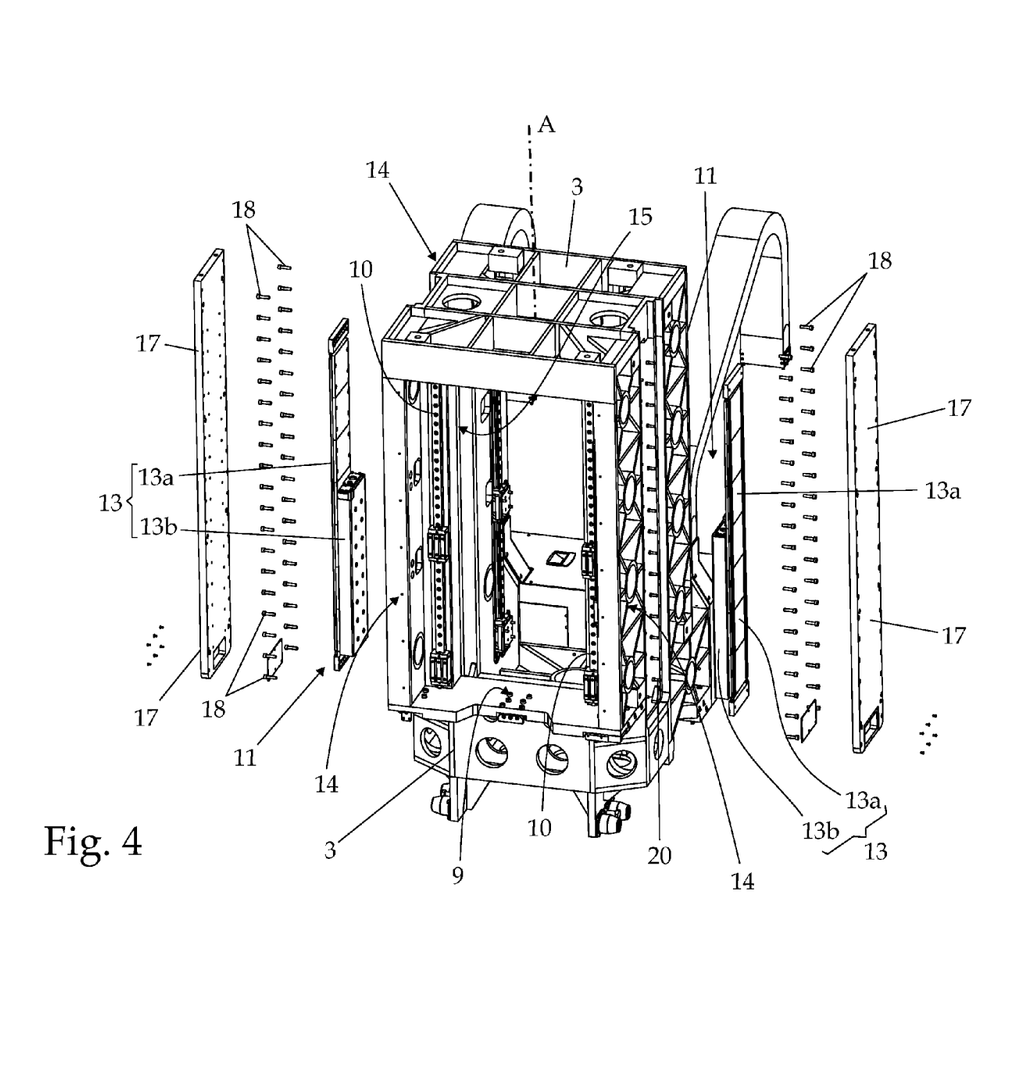
Figure 5:
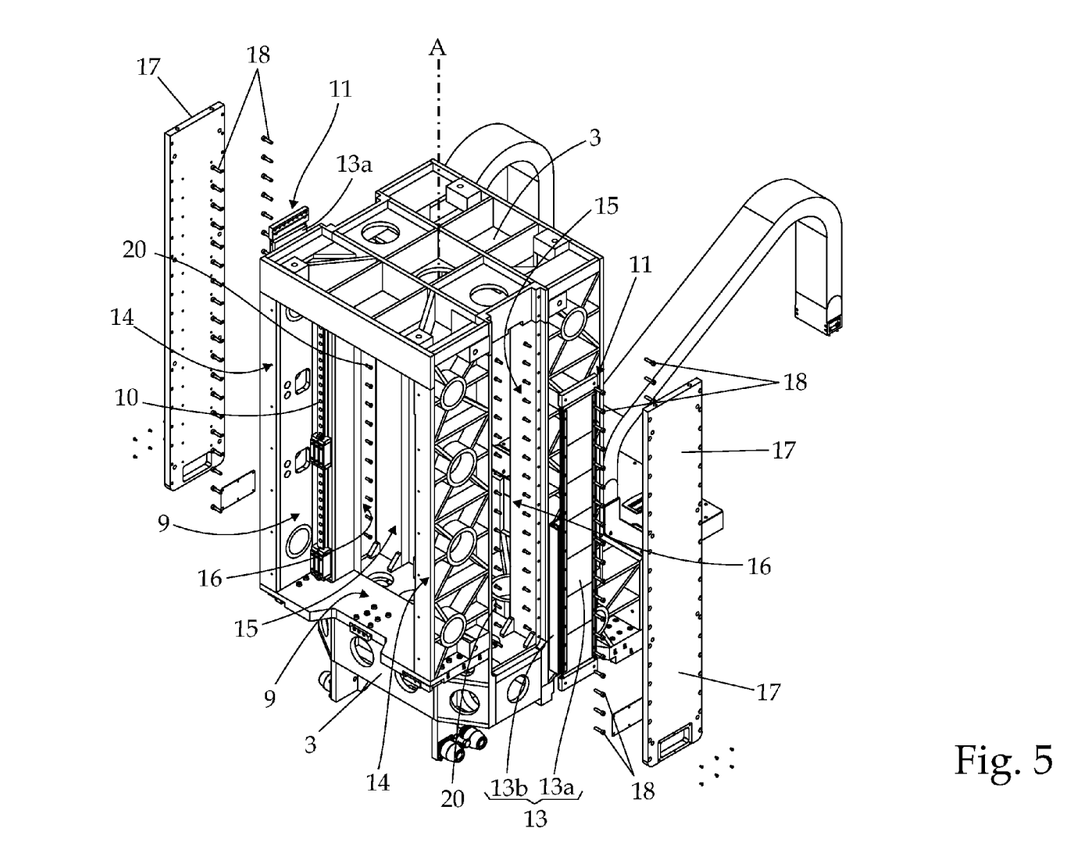

With reference to FIGS. 3, 4 and 5, the drive assembly 11 comprises two combined electric linear motors 13, which are arranged on opposite sides of the head-carrier slide 6 with respect to the lying plane of the longitudinal slit 9 (i.e. on opposite sides of the vertical midplane of supporting column 3), and are structured so as to be able to move, on command and jointly, the head-carrier slide 6 up and down along the straight vertical guides 10 of supporting column 3.

In other words, longitudinal slit 9 of supporting column 3 is laterally delimited by two lateral walls or sides 14, which are parallel to the lying plane of longitudinal slit 9, i.e. parallel to the vertical midplane of supporting column 3, and each linear electric motor 13 is interposed between the head-carrier slide 6 and a corresponding lateral side or wall 14 of the supporting column 3.

Additionally, the two electric linear motors 13 are moreover located inside the longitudinal slit 9, again on opposite sides of the head-carrier slide 6, so that each electric linear motor 13 is interposed between a respective lateral side of the head-carrier slide 6 and the adjacent lateral side or wall 14 of supporting column 3, and are altogether structured so as to be able to move, on command, the head-carrier slide 6 up and down along the straight vertical guides 10 of the supporting column 3.

Preferably, the two electric linear motors 13 are furthermore arranged inside the longitudinal slit 9, in specular position on opposite sides of the barycenter of the head-carrier slide 6.

With reference to FIGS. 4 and 5, each electric linear motor 13 is furthermore arranged/housed inside a substantially rectangular-shaped, straight longitudinal recess or groove 15 which extends vertically along the lateral side or wall 14 of supporting column 3, preferably substantially along the center-line of the same lateral side or wall 14 and preferably substantially for the entire length of longitudinal slit 9, and directly communicates with/faces the inside of the same longitudinal slit 9.

More in detail, the electric linear motor 13 comprises a stationary stator track 13a, and a traveling slide 13b which is moveable grazing the stator track 13a. The stator track 13a is rigidly attached to the lateral side or wall 14, on the bottom of the longitudinal recess or groove 15 present on the lateral side or wall 14, and extends parallel to the longitudinal/vertical axis A of the supporting column 3, preferably substantially for the entire length of the longitudinal recess or groove 15. Preferably, the stator track 13a of electric linear motor 13 is furthermore attached to the lateral side or wall 14 of supporting column 3 in a rigid and stable, though easily removable manner.

The traveling slide 13b is instead rigidly attached onto the side of the head-holder slide 6, and protrudes into the longitudinal recess or groove 15 towards the bottom thereof, so as to locally face and be tangent to a portion of the stator track 13a. Similarly to stator track 13a, the traveling slide 13b of electric linear motor 13 is furthermore attached to the side of the head-carrier slide 6 in rigid and stable, though easily removable manner.

In the example shown, in particular, the stator track 13a of electric linear motor 13 preferably comprises a long sequence of permanent magnets (not shown) that are arranged by the side to one another to form a straight ribbon-like body, which is structured so to be rigidly attached onto the lateral side or wall 14 of supporting column 3, on the bottom of the longitudinal recess or groove 15. The traveling slide 13b of electric linear motor 13 instead incorporates the electric windings which, if appropriately powered, cause and control the movement of the traveling slide 13b along the stator track 13a.

More in detail, with reference to FIGS. from 1 to 5, each lateral side or wall 14 of supporting column 3 is provided with a long, pass-through, straight lateral gap 16 which extends parallel to the longitudinal/vertical axis A and to the vertical midplane of supporting column 3, preferably substantially at the center-line of the lateral side or wall 14 and preferably substantially for the entire length of the longitudinal slit 9, and communicates/connects directly to the longitudinal slit 9 of supporting column 3.

The opening/entrance of the pass-through lateral gap 16 faced towards the outside of supporting column 3 is moreover closed/plugged by a long plate-shaped cover 17 which is substantially complementary in shape to that of the gap, is preferably made of metal material and is attached onto the lateral side or wall 14 of supporting column 3 in rigid and stable, though easily removable manner, so as to form the bottom of the straight longitudinal recess or groove 15.

In the example shown, in particular, the plate-shaped cover 17 is preferably fastened onto the lateral side or wall 14 of the supporting column 3 in rigid and stable, though easily removable manner, by means of a series of pass-through bolts 18 appropriately distributed along the entire perimeter of the plate-shaped cover 17.

The stator track 13a of electric linear motor 13 is fastened directly onto the plate-shaped cover 17 in rigid and stable though easily removable manner, preferably by means of a series of pass-through bolts 20 which are appropriately distributed along the entire perimeter of the stator track 13a. The traveling slide 13b of electric linear motor 13 instead is fastened to the head-carrier slide 6 in rigid and stable though easily removable manner, preferably by means of another series of pass-through bolts (not shown), the heads of which face towards the plate-shaped cover 17.

With reference to FIG. 3, preferably the electronic-controlled drive assembly 11 furthermore comprises a weight balancing device 21 which is interposed between the head-carrier slide 6 and the supporting column 3, and is structured so as to continuatively exercise an upward thrust on the head-carrier slide 6 of such a value to substantially compensate the weight of the head-carrier slide 6 and of everything integral therewith.

In other words, the weight balancing device 21 can continuatively exercise an upward force on the head-carrier slide 6, the value of which is preferably substantially equal to the weight force due to the mass of the head-carrier slide 6, of the supporting beam 7, of the tool-holder head 8, and of every other component attached to the head-carrier slide 6.

In the example shown, in particular, the weight balancing device 21 preferably comprises two dual-acting hydraulic cylinders 22, which are arranged vertically into the longitudinal slit 9 of supporting column 3, on opposite sides of the head-carrier slide 6 with respect to the lying plane of the longitudinal slit 9, so that each hydraulic cylinder 22 is immediately adjacent to a respective electric linear motor 13.

Furthermore, each hydraulic cylinder 22 is preferably arranged vertically in slit 9 with the outer tubular case 22a in abutment on the body of the vertical supporting column 3 at the lower end of the longitudinal slit 9. The distal end of the moveable rod 22b of hydraulic cylinder 22 is instead connected in rigid manner to the lateral side of the head-carrier slide 6, preferably at the side of the traveling slide 13b of electric linear motor 13.

Figure 6:
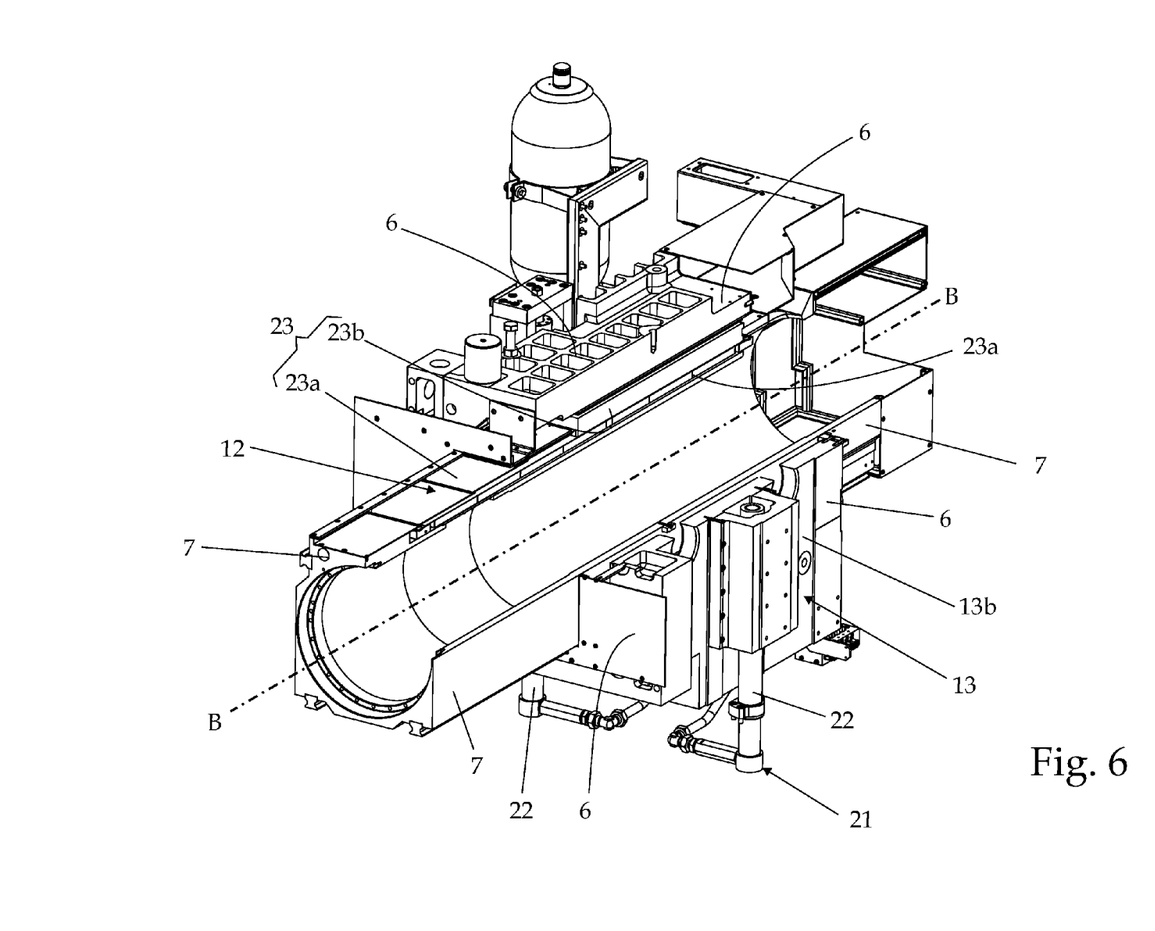
FIG. 6 is a partially-sectioned axonometric view of the head-carrier slide/transversal beam assembly of the machine-tool shown in the preceding figures, with parts removed for clarity.

With reference to FIGS. 1 and 6, similarly to drive assembly 11, also drive assembly 12 preferably comprises an electric linear motor 23 which is interposed between the head-carrier slide 6 and the supporting beam 7, is structured so as to be able to move, on command, the supporting beam 7 forwards and backwards with respect to the head-carrier slide 6 parallel to the longitudinal axis B of the supporting beam 7.

More in detail, the electric linear motor 23 comprises a stationary stator track 23a, and a traveling slide 23b which is moveable grazing the stator track 23a. The stator track 23a is rigidly attached to the upper face of the supporting beam 7, i.e. on the flat face of the supporting beam 7 opposite to the base plate 2, and extends parallel to the longitudinal axis B of supporting beam 7, preferably substantially for the entire length of the supporting beam 7, so as to engage, in pass-through and sliding manner, the through hole present in the head-carrier slide 6 jointly with the supporting beam 7. Preferably, the stator track 23a of electric linear motor 23 is furthermore fixed to the horizontal supporting beam 7 in a rigid and stable, though easily removable manner.

The traveling slide 23b instead is rigidly fastened on the top of the head-carrier slide 6, so as to locally face and be tangent to a portion of the stator track 23a.

More in detail, the traveling slide 23b is fitted inside a hollow seat which is formed on the top of head-carrier slide 6, adjacent to and communicating with the through hole in which the supporting beam 7 is axially moveable, so as to face the inside of the through hole to locally face and be tangent to the portion of the stator track 23a which is, at the moment, enclosed inside the head-carrier slide 6.

Similarly to stator track 23a, the traveling slide 23b of electric linear motor 23 is preferably also fastened to the top of head-carrier slide 6 in rigid and stable, though easily removable manner.

In the example shown, in particular, the stator track 23a of electric linear motor 23 preferably comprises a long sequence of permanent magnets (not shown) that are arranged by the side to one another to form a straight ribbon-like body, which is structured so to be rigidly attached onto the upper flat face of the horizontal supporting beam 7. Preferably, the traveling slide 23b of electric linear motor 23 instead incorporates the electric windings which, if appropriately powered, cause and control the movement of the traveling slide 23b along the stator track 23a.

With reference to FIG. 1, preferably the machine-tool 1 is finally provided with a part-holding table 24 which is placed by the side of the base plate 2, so as to face and be easily reached by the tool-carrier head 8, and is structured so as to be able to firmly hold the metal piece to be machined, possibly with the capability of turning, on command, the metal piece about one or more reference axes, preferably orthogonal to one another.

Operation of numeric control machine-tool 1 is easily inferred from the description above and thus does not require further explanations.

The advantages deriving from the particular structure of the electronically-controlled drive assembly 11 controlling the movement of the head-carrier slide 6 along the supporting column 3 are considerable.

Firstly, the fastening of the stator tracks 13a of the two electric linear motors 13 onto the plate-shaped covers 17 which close the vertical pass-through gaps 16 made on the two lateral sides or walls 14 of supporting column 3 allows to access each electric linear motor 13 very rapidly and easily, thus greatly simplifying the maintenance operations of the electronically-controlled drive assembly 11 controlling the movement of the head-carrier slide 6 along the supporting column 3.

Similarly, the arrangement of stator track 23a of electric linear motor 23 on the upper face of supporting beam 7, and the consequent arrangement of the traveling slide 23b on the top of head-carrier slide 6, allow to access the electric linear motor 23 extremely rapidly and easily, thus greatly simplifying the maintenance operations of the electronically-controlled drive assembly 12 controlling the movement of supporting beam 7 on the head-carrier slide 6.

It is finally apparent that changes and variants can be made to the above-described numeric control machine-tool 1 without however departing from the scope of protection of the present invention.

What is claimed is:

1. A numerical control machine-tool, comprising:
   a ground-resting base plate;
   a movable supporting column that has a longitudinal axis extending there through, wherein the supporting column rises cantilevered from the base plate in a substantially vertical direction, and is capable of moving horizontally on said base plate;
   a first electronic-controlled drive assembly which is capable of moving the supporting column along the base plate;
   a head-carrier slide, which is fixed in a vertically sliding manner in a straight longitudinal slit extending along a first face of the supporting column, wherein the head-carrier slide is configured to slide parallel to the longitudinal axis of the supporting column;
   a second electronic-controlled drive assembly which is capable of moving the head-carrier slide along the supporting column;
   a straight supporting beam that has a longitudinal axis extending there through, wherein the supporting beam is inserted in an axially sliding manner into the head-carrier slide, and is cantilevered so as to extend out from the first face of the supporting column while remaining substantially parallel to the ground; and
   a third electronic-controlled drive assembly which is capable of moving the supporting beam forwards and backwards with respect to the head-carrier slide parallel to the longitudinal axis of the supporting beam;
   the second electronic-controlled drive assembly comprising, in turn, two electric linear motors which are placed inside the longitudinal slit of the supporting column, on opposite sides of the head-carrier slide, so that each electric linear motor is interposed between a respective lateral side of the head-carrier slide and an adjacent lateral wall of the supporting column, wherein each electric linear motor comprises a traveling slide and an associated stationary stator track, and each traveling slide is movable along said associated stator track;
   wherein each lateral wall of the supporting column is provided with a lateral pass-through straight gap which extends parallel to the longitudinal axis of the supporting column, and directly communicates with the longitudinal slit of the supporting column,
   wherein each lateral pass-through straight gap has an outer entrance that is plugged by a plate-shaped cover which is fixed in a rigid and removable manner onto a corresponding lateral wall of the supporting column, so as to form the bottom of a straight longitudinal recess or groove which faces the inside of the longitudinal slit of the supporting column; and
   wherein each electric linear motor of said second electronic-controlled drive assembly is located in a corresponding one of the longitudinal recesses or grooves such that each stator track is rigidly fixed to the plate-shaped cover corresponding to the adjacent lateral wall, and each traveling slide is rigidly fixed onto the respective lateral side of the head-carrier slide, so as to protrude into the corresponding one of the longitudinal recesses or grooves and be arranged locally facing a portion of said associated stator track.

2. The numerical control machine-tool according to claim 1, wherein the two electric linear motors are arranged inside the longitudinal slit of the supporting column on opposite sides of the barycenter of the head-carrier slide.

3. The numerical control machine-tool according to claim 1, wherein each lateral pass-through straight gap extends along the corresponding lateral wall of the supporting column substantially at the center-line of the same lateral wall.

4. The numerical control machine-tool according to claim 1, wherein the second electronic-controlled drive assembly further comprises a weight balancing device which is interposed between the head-carrier slide and the supporting column, and is structured so as to exercise an upward thrust on the head-carrier slide of such a value to substantially compensate the weight of the head-carrier slide and everything integral therewith.

5. The numerical control machine-tool according to claim 4, wherein the weight balancing device comprises two hydraulic cylinders which are located inside the longitudinal slit of the supporting column, on the opposite sides of the head-carrier slide with respect to the longitudinal slit, so that each hydraulic cylinder is adjacent to a respective electric linear motor of the second electronic-controlled drive assembly.

6. The numerical control machine-tool according to claim 1, wherein the third electronic-controlled drive assembly comprises an electric linear motor which is interposed between the head-carrier slide and the supporting beam, and is structured so as to move, on command, the supporting beam forwards and backwards with respect to the head-carrier slide parallel to the longitudinal axis of the supporting beam.

7. The numerical control machine-tool according to claim 6, wherein:
  said electric linear motor of the third electronic-controlled drive assembly comprises a stationary third stator track and a third traveling slide, which is movable along said third stator track;
  the third stator track being rigidly attached to the upper face of the supporting beam, so as to extend parallel to the longitudinal axis of the supporting beam; and
  the third traveling slide being rigidly attached to the top of the head-carrier slide, so as to locally face a portion of said third stator track.

8. The numerical control machine-tool according to claim 1, wherein:
  the longitudinal slit of the supporting column extends in a pass-through manner from the first face of the supporting column to a second face of the supporting column, wherein the second face of the supporting column is disposed on an opposing side of the supporting column than the first face; and
  the supporting beam is inserted in a pass-through and axially sliding manner in a through hole made in the head-carrier slide, so as to be cantilevered and extend out from both the first face and the second face of the supporting column.

9. The numerical control machine-tool according to claim 1, further comprising a tool-carrier head that is attached to an end of the supporting beam.

10. The numerical control machine-tool according to claim 1, wherein the first electronic-controlled drive assembly comprises an electric linear motor interposed between the base plate and the bottom face of the supporting column.

* * * * *